United States Patent
Wang et al.

[11] Patent Number: 5,805,733
[45] Date of Patent: Sep. 8, 1998

[54] METHOD AND SYSTEM FOR DETECTING SCENES AND SUMMARIZING VIDEO SEQUENCES

[75] Inventors: Katherine Wang, San Jose; James Normile, Woodside, both of Calif.

[73] Assignee: Apple Computer, Inc., Cupertino, Calif.

[21] Appl. No.: 354,367

[22] Filed: Dec. 12, 1994

[51] Int. Cl.[6] ............................. G06K 9/36; G06K 9/46; G06K 15/00; G06F 15/00
[52] U.S. Cl. ................... 382/232; 382/236; 364/514 A; 395/154
[58] Field of Search .................................. 382/232, 236, 382/252, 238; 364/514 A; 395/154

[56] References Cited

U.S. PATENT DOCUMENTS

| | | | |
|---|---|---|---|
| 4,270,143 | 5/1981 | Morris | 358/105 |
| 4,931,868 | 6/1990 | Kadar | 364/521 |
| 5,049,991 | 9/1991 | Nihara | 358/105 |
| 5,404,174 | 4/1995 | Sugahara | 348/700 |
| 5,459,517 | 10/1995 | Kunitake et al. | 348/700 |
| 5,521,841 | 5/1996 | Arman et al. | 364/514 A |
| 5,537,528 | 7/1996 | Takahashi et al. | 395/154 |

*Primary Examiner*—Andrew Johns
*Assistant Examiner*—Monica S. Davis
*Attorney, Agent, or Firm*—Fenwick & West LLP

[57] ABSTRACT

A method and system summarizes scenes in a video sequence by detecting scene changes, and then comparing scenes in a moving window to determine their similarity. Similar scenes are consolidated and represented by a representative frame, a number of which are displayed to a user. Scene changes are detected by comparing average color histograms for each scene, motion compensated pixel differences or motion compensated edge maps, or a combination of these methods. Scenes in the video sequence are selected for summarizing according to their normalized time duration. Of the selected scenes, similar or related scenes are determined by comparing the average color histograms of each pair of scenes in a moving window, using a standard population error measure, such as a Chi-squared test. For each set of related scenes, a representative frame is taken, either as the medial frame from the entire time duration of the related scenes or as the first frame of the medial scene in the set. The representative frames are displayed to the user, wherein set of related scenes are retrived by selecting the representative frame for the set. A movie bar, a visual representation of a rectangular prism, is displayed to show the relative length and positioning of the related scenes.

24 Claims, 7 Drawing Sheets

METHOD AND SYSTEM FOR DETECTING SCENES AND SUMMARIZING VIDEO SEQUENCES

BACKGROUND

1. Field of the Invention

This invention relates to the field of video editing and manipulating, and more particularly, to methods and systems for reviewing and analyzing video data.

2. Background of the Invention

The increasing integration of computer technologies and video production technologies produces a need to readily access and manipulate video information. Because video is a continuous medium, users of video need a way to summarize the content of a video easily and quickly in order to catalog and store the video for rapid future retrieval and use. A useful framework for analyzing videos is the use of scenes. A video is typically made of a number of scenes, each of which contains a number of visually related frames that were recorded from a given vantage point or location. For example, a video of a conversation between several individuals may have various scenes of each person talking, and there may be multiple scenes for a given person speaking throughout the video. To aid searching for a particular frame, a user typically desires to know the content and location of each scene in the video. Scene detection techniques are known, but such techniques can only identify scene transitions, and are unable to consolidate individual scenes that are properly considered to be one scene because of the similarity of the frames in the scenes. Consolidation of scenes is useful to quickly summarize a video.

Summarizing is distinct from searching, and provides an overview of the contents of a given video by identifying throughout an entire video temporally disjoint scenes that can be considered a single scene. In addition, summarizing is useful to provide a viewer with the actual flow or change of scenes in a video, since the viewer may be looking for a particular sequence of scenes. Currently, in order to properly summarize a video, a human observer would have to review the entire tape, identify and describe each scene separately, noting at what point in the video each scene occurs. This information would then have to be input into a database for later retrieval based on text entry. This is a time consuming process. Finally, it is common in most videos to have many duplicative scenes. In order to remove or consolidate such scenes, a viewer has manually reviewed and edited the scenes, due to no currently available mechanism for automatically performing this time consuming process.

SUMMARY OF THE INVENTION

The present invention provides a method for summarizing a video sequence or any other temporally ordered sequence of images into a number of distinct scenes. Scene changes are detected using a number of different image analysis techniques in order to identify distinct individual scenes. The scenes to be summarized are then compared with selected other scenes. The comparison is performed using a standard error measure on the average color histograms for each scene. The principle employed here is that similar scenes will have substantially similar average color distributions. Each group of related scenes is then represented by a frame selected from the set of scenes by displaying the representative frame to the user. Representing each set of related scenes with a representative frame enables the user to view a larger sampling of the video sequence which is otherwise impossible if every scene were displayed to the user.

More particularly, related scenes may be consolidated by determining for each scene an average color histogram for all frames in the scene, then comparing the average color histograms of each scene with a fixed number of subsequent scenes, creating in effect, a moving window for comparison. Scenes in the window having substantially similar average color histograms form a group of related scenes. The moving window is used to limit the number of comparisons at any given time. This results in computational efficiency, by reducing the search space, because all scenes in a group of related scenes need not appear in the window at the same time. A representative frame is then taken for each group of related scenes. The representative frames can be a frame that is halfway between first and last scenes in the group of redundant scenes.

Once all the representative frames are determined, they are displayed concurrently, with each frame displayed to the user at the same time in the order in which the scenes appear in the video sequence. As a further refinement, the scenes are displayed in a three dimensional representation called a "movie bar," which is a rectangular prism comprised of slices of each frame in each scene. The scene changes are highlighted to indicate to the user where each scene begins and ends. In addition, accordion segments may be included in the movie bar to represent a number of related scenes without extending the length of the movie bar beyond the width of the display device being used. The user can access scenes represented by the accordion segment by selecting the segment, which then expands to show its scenes.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

DETAILED DESCRIPTION OF THE INVENTION

Figure 1:
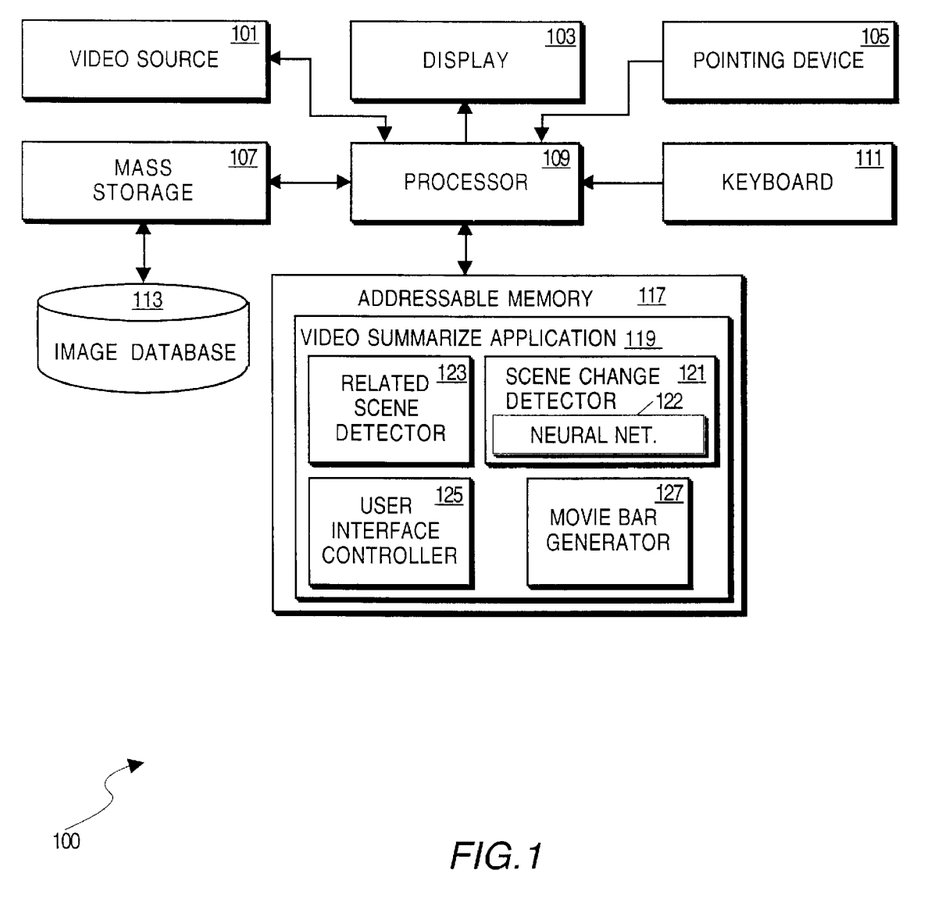
FIG. 1 is an illustration of a system of the present invention.

Referring now to FIG. 1, there is shown one embodiment of a system for summarizing video sequences. The summarizing system 100 includes a processor 109 operatively coupled to a display 103, a pointing device 105, a keyboard 111, a mass storage device 107, and an addressable memory 117. In the preferred embodiment the processor 109 is from the 68000 family or PowerPC family produced by Motorola, Inc., and used in the Macintosh™ brand of personal computers manufactured by Apple Computer, Inc. The mass storage device 107 is for permanently storing video sequences and the like, including digitized (or digitally produced) video images, or animations. The mass storage device 107 is conventional design, with sufficient capacity, preferably in excess of 500 Mb, to store a large number of digitized video sequences. The video sequences may be stored in the mass storage device 107 in an image database 113, or other suitable data storage for easy retrieval and indexing. Video sequences are input into the image database 113 from the video source 101, which may be a digitizer or conventional graphic design or video production applications. The display 103 is also of conventional design and should have sufficient resolution to display at least 640×480 pixels, preferably with at least 16 bit color depth. The display 103 is also used to display a user interface to the summarizing system 100, the user interface provided by the user interface controller 125. The pointing device 105 may be a mouse, a stylus, a touch-sensitive screen, or a voice activated command processor, or the like device, for providing inputs to the processor 109 via the user interface controller 125, such as for controlling a cursor and other elements provided in the user interface. A keyboard 111 is also provided for inputting commands to the summarizing system 100.

The addressable memory 117 stores a video summarize software application 119 that controls the processor 109 for effecting the methods of the present invention. The summarize application 119 includes a scene change detector 121 that detects the scene changes between distinct scenes, having a minimum time duration. The related scene detector 123 normalizes the time duration of the scenes to select the most significant scenes for summarizing, and analyzes the selected scenes to determine which scenes are related to each other. The user interface controller 125 accepts user inputs for inputting the video sequence to be summarized, displaying the results of the summarization process, specifically the representative frames for each set of related scenes, and the movie bar. The movie bar generator 127 creates the movie bar from the scenes. The operation of these various code modules is further described below.

Figure 2:
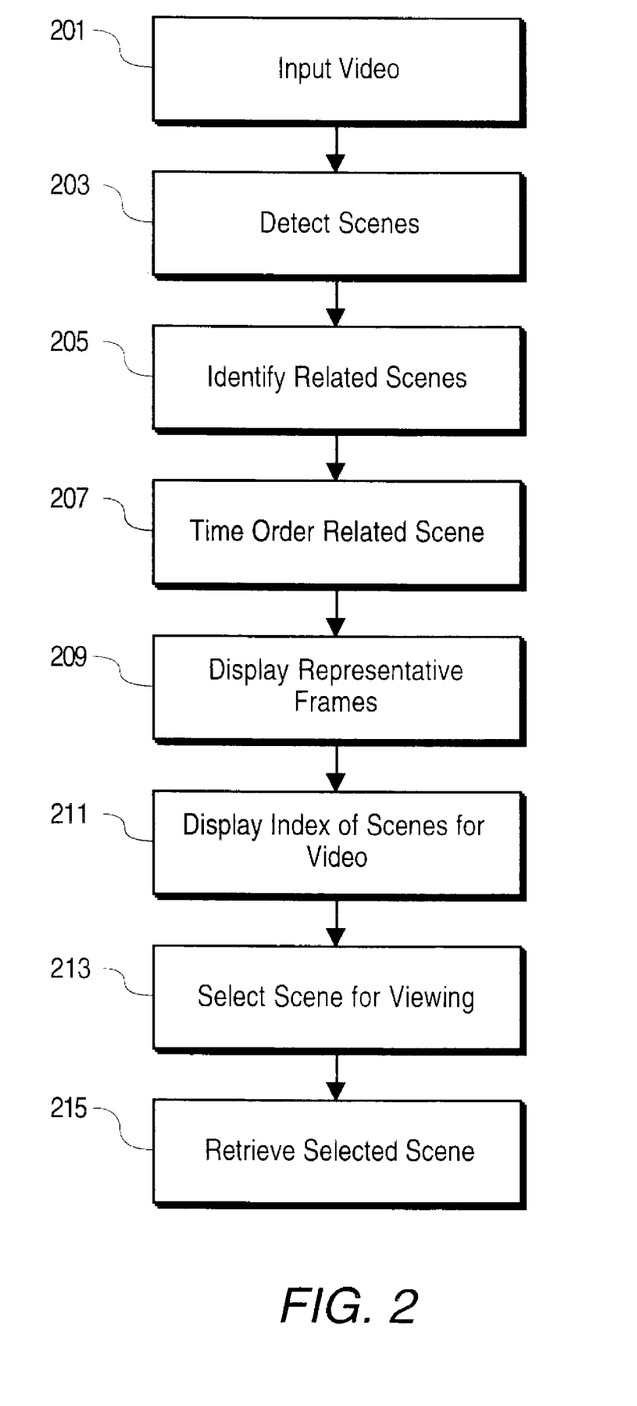
FIG. 2 is a flowchart of the method of the present invention.

Referring now to FIG. 2, there is shown a flowchart for the method of summarizing video sequences. The user inputs 201 a video sequence into the system 100, or retrieves a video sequence from the mass storage device 107. The scene change detector 121 then processes the video sequence to detect 203 individual scenes. The related scene detector identifies 205 disparate related scenes, consolidating the video sequence into a smaller number of scenes. The related scenes are then time ordered 207, and displayed 209 by the user interface controller 125, showing a representative frame from each set of related scenes. An index of the scenes in the video sequence is also displayed 211, here the movie bar is created by the movie bar generator 127. The user may then select 213 any number of scenes for viewing in their entirety, the system 100 retrieving 215 each selected scene, and displaying it to the user.

Figure 3:
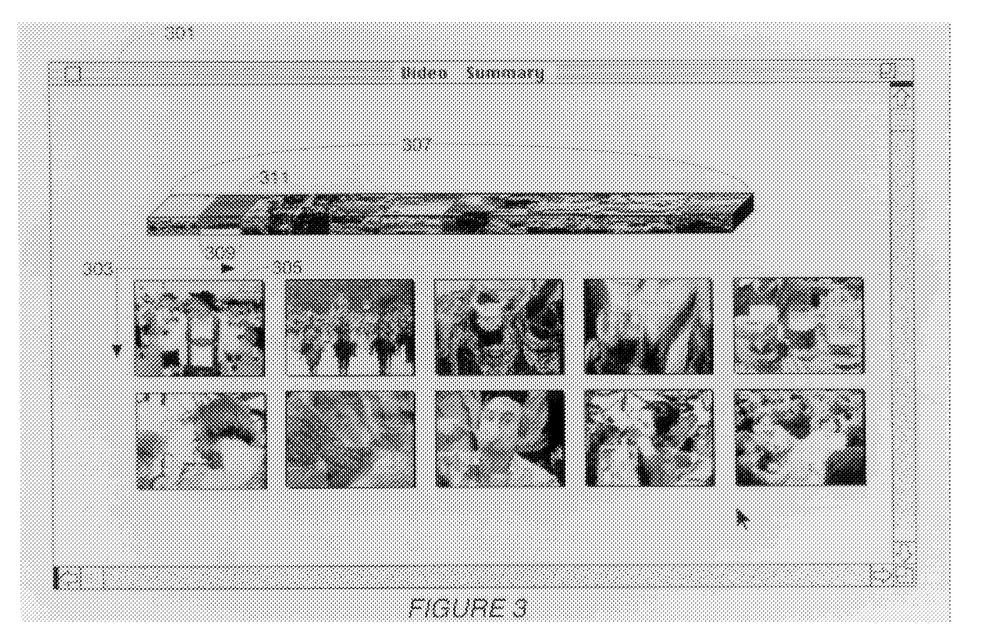
FIG. 3 is an illustration of the user interface of the present invention.

FIG. 3 shows an illustration of one embodiment of a user interface for displaying summarized scenes, as produced by the user interface controller 125. A window 301 includes a collage 303 made up of a representative frame 305 for each set of summarized scenes. In the preferred embodiment, a representative frame for a set of summarized scenes is taken from the temporally medial scene in the set; alternatively, it can be taken as one of the frames of the longest scene in a set, the longest scene being most indicative of the content of the related scenes. The representative frames are ordered according to the temporal position of the scenes they represent in the video sequence. An index of the scenes in the video sequence is also displayed, preferably in the form of a movie bar 307. The movie bar 307 represents each frame in the entire video sequence as a "slice", the movie bar 307 appearing as a stack of slices. A scene 311 is represented in the movie bar 307 as a set of slices, and is visually delineated to indicate the beginning and ending frames of the scenes, for example, with distinct scene breaks 309. The user may retrieve a scene or frame by selecting it with the pointing device, either in the movie bar 307 or the collage 303. The creation of the movie bar 307 is further described below with respect to FIG. 6.

Figure 4:
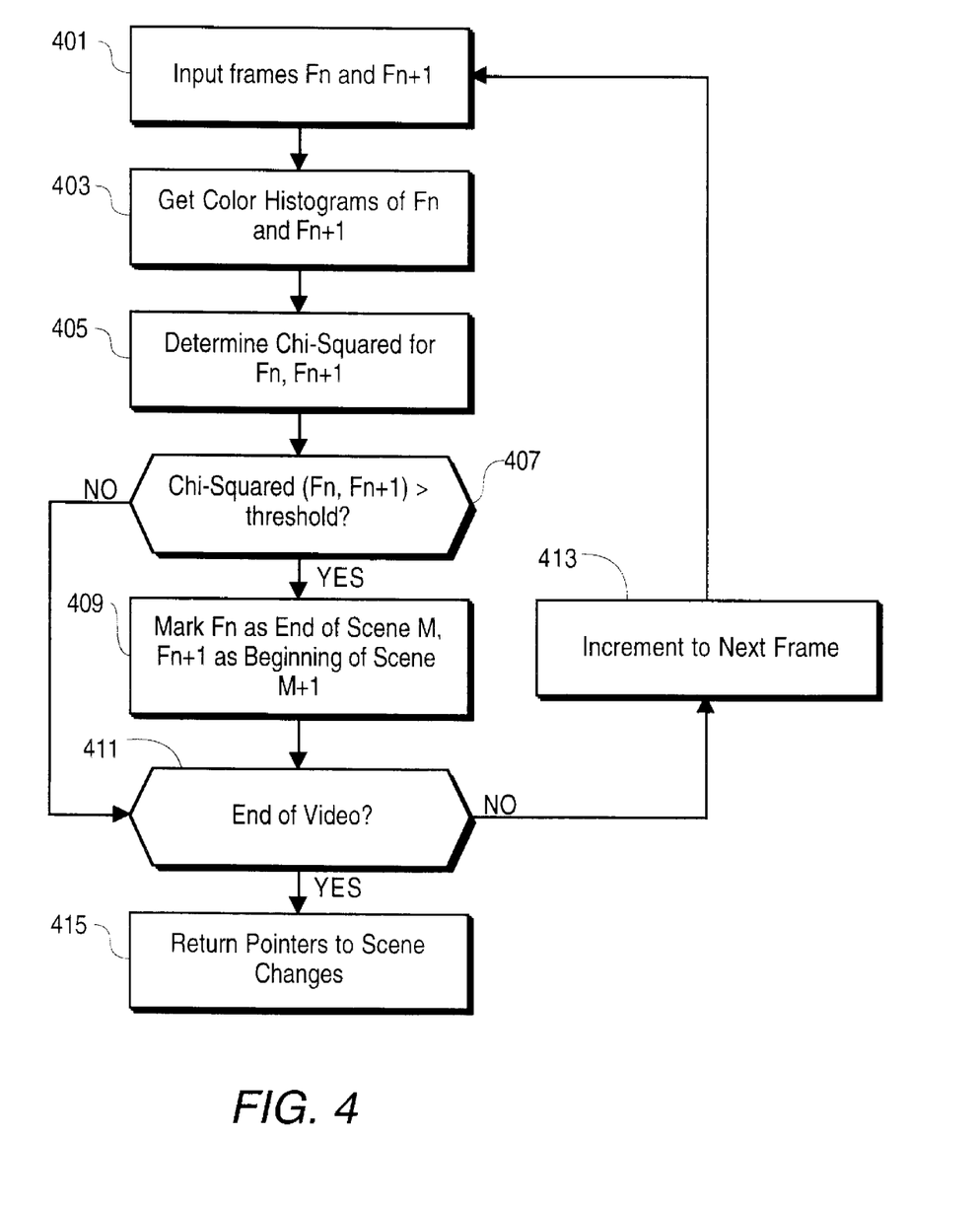
FIG. 4 is a flowchart of the process steps for detecting scene changes.

Referring now to FIG. 4 there is shown a flowchart for one method of detecting 203 scene changes with the scene change detector 121. In this method, the frames of the video sequence are input 401 one by one. The scene change detector 121 generates 403 a color histogram for each frame F. In the preferred embodiment, the scene change detector 121 uses bin segmentation of the HSV color space, with each bin representing 10° of hue and 10% change in saturation, resulting in 360 color bins. A Chi-squared value is computed 405 by the scene change detector 121 for each pair of adjacent frames $F_n$, $F_{n+1}$ to determine if their color histogram distributions are similar. If the $X^2$ value is greater than a predetermined threshold 407, then the color histograms are significantly dissimilar, and likely to indicate a scene change, since frames in a given scene typically have very similar color histograms. When the $X^2$ value exceeds the threshold, then frame Fn is marked 409 as the end of one scene M, and frame $F_{n+1}$ is marked as the beginning of another scene M+1. Frame Fn+1 is checked 411 if it is at the end of the video sequence, and if not, the scene change detector increments 413 to the next frame $F_{n+1}$. When the scene change detector 121 has processed all frames of the video sequence for scene changes, the scene change detector 121 returns a set of pointers to the frames marked as scene changes to allow further processing. The time duration of each scene M is then determined from the difference in frame numbers between the first and last frames of a scene.

Other methods may also be used in the scene change detector 121 to detect 203 scene changes. For example, motion compensated pixel differences can be used by first calculating a set of motion vectors, using conventional techniques, for a given frame $F_n$, predicting a following frame $F_{n+1}$ using the motion vectors, and then taking a prediction error as the summed squared differences in luminance values over all pixels in the predicted frame $F_{n+1}$ and the actual frame $F_{n+1}$. If the prediction error exceeds a predetermined threshold, then there is a scene change between $F_n$ an $F_{n+1}$ which can be handled as shown above. In addition, this method can be further enhanced by performing a histogram equalization on the frames of the video sequence. Alternatively, instead of using motion vectors to compensate for pixel difference, motion vectors can be used to generate prediction errors for edge maps between frames. Finally, the scene change detector 121 may combine all three motion based methods to provide robust detection of scene changes.

As a further alternative scene change detection method, a neural network 122 may be employed within the scene change detector 121. The inputs to the neural net 12 include Chi-squared values for pairs of frames, as above, normalized motion compensated pixel differences, and global measurements, such as mean luminance, variance, entropy for each frame, and the like, and differences between these values for pairs of frames. The weights for the neural net 122 are determined using a conventional backward propagation procedure, or other suitable learning or update procedure, using a training video sequence having a variety of scenes and scene changes. Backward propagation here essentially performs a "surface fitting" so as to minimize the reference signal, here the training video with "correct" scene changes previously selected, and the output of the neural net 122, for all the training sequences. The weights are set at the end of the training, and are used from then on to detect scene changes. The neural net 122 is not adapted to new incoming video sequences, due to computational requirements, though in alternative embodiments of the neural net 122 based on higher performance processors, such adaptation may be readily performed. Alternatively, the neural network can be periodically re-trained.

Figure 5:
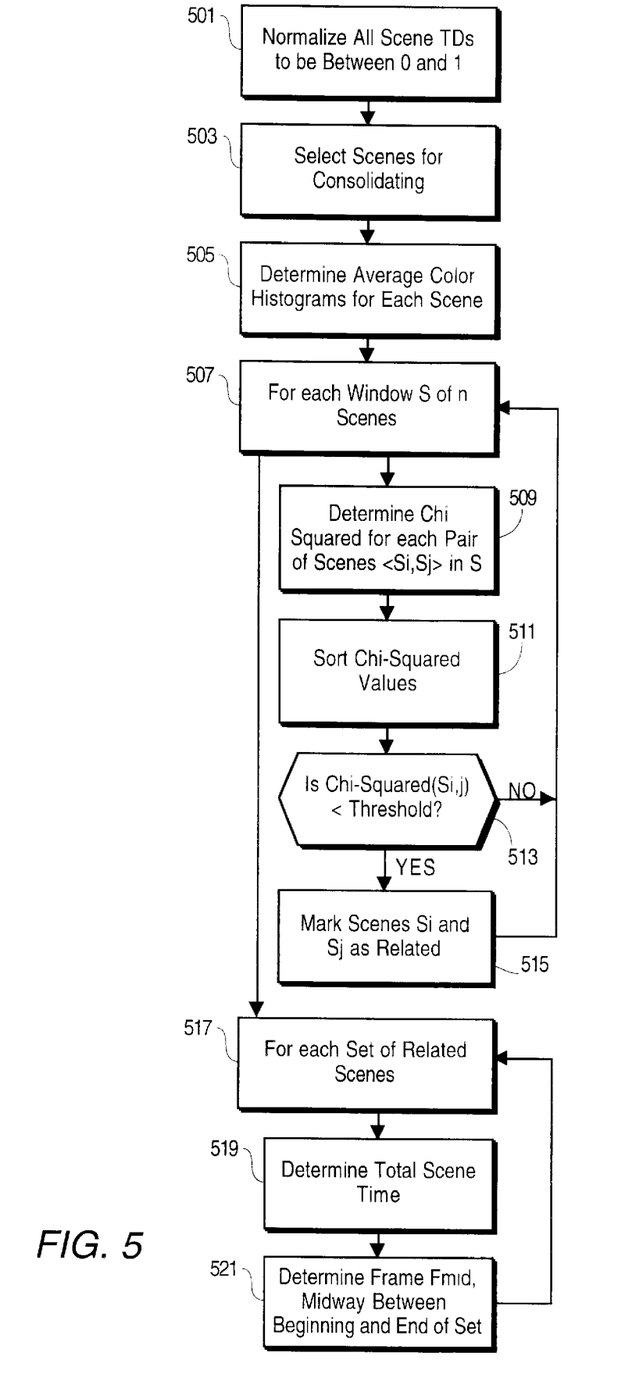
FIG. 5 is a flowchart of the process steps for consolidating related scenes.

Referring now to FIG. 5, there is shown a flowchart of a method of consolidating scenes to create a summarized video sequence. Because a lengthy video sequence may have a large number of scenes, it is preferred to summarize a video sequence by selecting those scenes for presentation to a user that probably have the most significant content. One way of estimating which scenes are most significant is by the length of the scene, as longer scenes typically are most important to the overall video sequence. Accordingly, the time duration of all of the detected scenes is normalized 501 in order to determine those scenes which are most significant. In the preferred embodiment normalizing is done by determining the mean and standard deviation for the time duration of all identified scenes. A lower bound for the time duration is set at the greater of the length of one frame or the mean time duration minus three standard deviations. An upper bound for time duration is similarly set at the mean time duration plus three standard deviations. The time duration of all scenes is then normalized between 1 and 0. Setting the upper and lower bounds for time prior to normalizing ensures that scenes with outlier time durations, either unusually long scenes or unusually short scenes, have a normalized time duration of 1.0 or 0.0, respectively. Once all time duration for each scene has been normalized, those scenes with a normalized time duration greater than a defined value, are selected 503 as the scenes for consolidating. In this manner, m% of the selected scenes can be selected on the basis of the normalized time duration alone, and (100−m)% can be selected as a weighted sum of normalized time duration and scene motion measures.

Once the appropriate scenes have been selected 503, the related scene detector 123 determines 505 an average color histogram for each scene by summing the color histograms of each frame in the scene, and then dividing the summed histogram by the number of frames in the scene. This average color histogram of each scene is then analyzed to determine its similarity to nearby scenes in a moving window of scenes, in order to determine if it can be consolidated with related scenes. A moving window is used because it is computationally efficient, and reduces need to compare all scenes in the video sequence with each other. Also, the window practically reflects the structure of video sequences, since scenes at remote portions of a video sequence are unlikely to be related, and if there is a repetition of a scene, it is generally significant enough to be included in the summary of the video. Accordingly, for each window S of n scenes (n can be predetermined or set by the user), a Chi-square test is performed 509 on each pair of scenes Si and Sj in the window, using the average color histograms for the scenes. The $X^2$ values for each pair of scenes are sorted 511. Each $X^2$ value is then compared 513 to a predetermined threshold. If the $X^2$ value is less then the threshold, then the scene Si and Sj for the $X^2$ value have significantly similar average color histograms, and thus are to be part of a single scene. The threshold may be set by the user, with lower thresholds resulting only very similar scenes being identified as related, and a higher threshold resulting in a wider variance in similarity. Accordingly, Si, and Sj are marked 515 as related and the bounding frame numbers for each scene are stored, so that any or all of the parts of the scenes can be retrieved. The $X^2$ values for all scenes in the window S are checked, as each scene may be related to multiples scenes in the window. While the Chi-squared test is used in the preferred embodiment, other standard error measures may also be suitably used.

This process is repeated 507 for each window of n scenes, beginning with the first scene that was selected 503. In the preferred embodiment, the window is "advanced" by one scene each time, though in alternate embodiments, a larger step may be taken between windows. After each window of scenes has been analyzed, and all related scenes identified, then 517 in each set of related scenes, the total scene time is determined 519, and the frame Fmid that is the midpoint of all the scenes is chosen 521 as a representative frame for all the related scenes. Alternatively, the middle frame of the longest scene in each set of related scenes can be used as Fmid. Referring to FIG. 2 again, the related scenes are time ordered 207, and the Fmid frames for each set of scenes are displayed 209 to the user by the user interface controller 125. The user may view a scene by selecting 213 one of the representative frames with the pointing device 105, the system 100 retrieving 215 and displaying the scenes associated with the representative frame.

Figure 6:
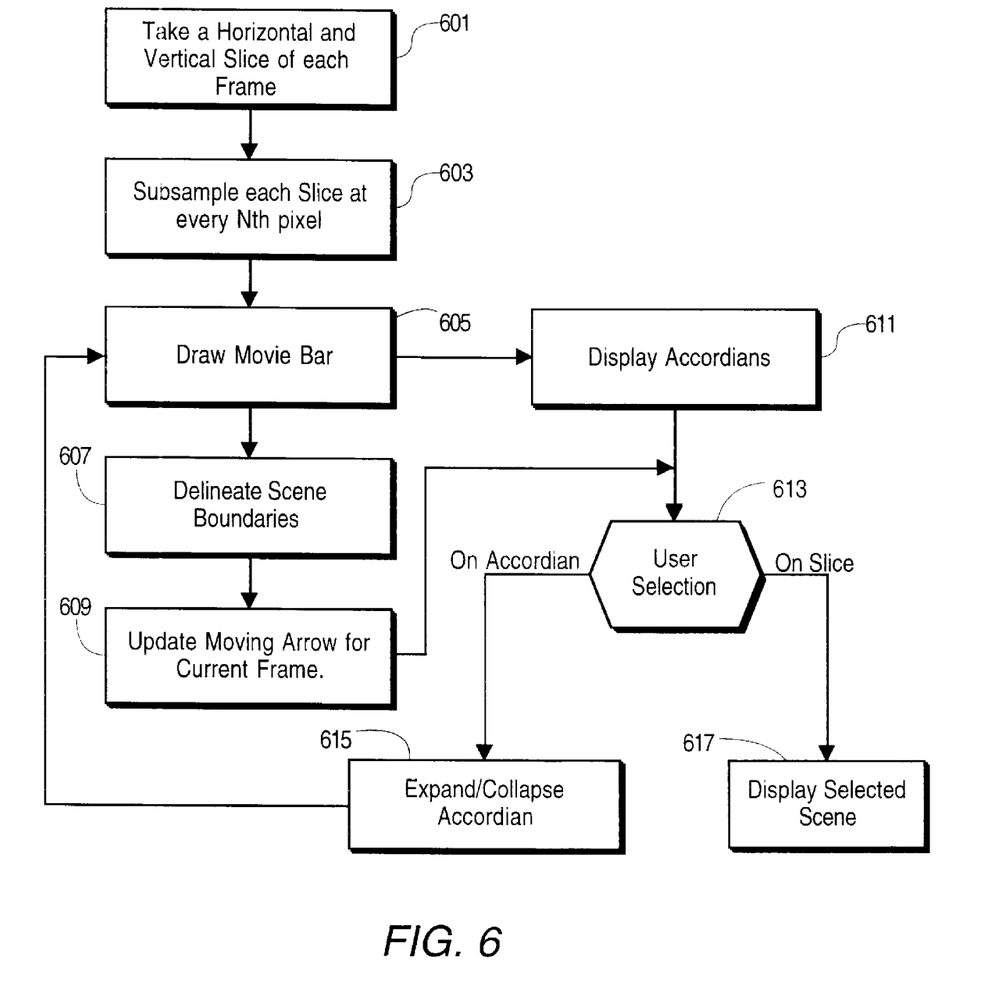
FIG. 6 is a flowchart for the process steps of displaying the movie bar.

Referring now to FIG. 6, there is shown a flowchart for creating an index of the video sequence for display 211 to the user. This flowchart describes the operation of the movie bar generator 127. In the preferred embodiment the index is displayed 211 in the form of a three dimensional movie bar 307, as shown in FIG. 3. The movie bar 307 is created by taking a vertical and horizontal slice, or set of pixels, from each frame in the video. The vertical slice may be the far left hand pixel column of the frame, and the horizontal pixel slice may be the top row of the frame. Alternatively, the slices may taken at the horizontal and vertical centers of the frame. Each slice is then subsampled 603 by taking every Nth pixel of the slice. This reduces the resolution of the slices by N, in order to accommodate the compacted appearance of the movie bar 307. Low pass filtering may be performed on each slice prior to subsampling.

Alternatively, instead of using slices based on sampled pixel values, the movie bar 307 can display 211 the most popular colors in the frame, for example, with most popular color is shown as the vertical slice of the frame, and the second most popular color is shown as the horizontal slice. In such a case, slicing 601 and subsampling 603 steps, are replaced by taking a color histogram of each frame and sorting the histogram by frequency. The color histogram may have already been computed for scene change detection, and so may be used here, otherwise it is determined as needed.

Once the content of the slices or edges has been determined, the movie bar 307 is drawn 605 by placing the vertical slices side by side, and the horizontal slices at an appropriate angle to simulate the appearance of a three dimensional rectangular prism, as illustrated in FIG. 3. The utility of the movie bar 307 is enhanced by delineating 607 scene boundaries by using brightly colored slices at the location for each scene change. Also, a moving arrow or other indicator, can be displayed 609 to show the location or position of the current scene and frame that the user is viewing at the time. The user may retrieve for display 617 a scene by selecting 613 one of the slices shown in the movie bar 307.

The movie bar 307 may be further enhanced for the users convenience when summarizing very long video sequences.

In such a video sequence, it is likely that the movie bar 307 would become much longer than the width of the display. In such instances, a conventional technique for showing the movie bar 307 would be to add a horizontal scroll bar to the movie bar 307, for accessing additional scenes. However, this technique would not allow the user to comprehend the entire summarized video sequence at one time, and would impede the user in attempting to access various scenes quickly and efficiently.

Figure 7:
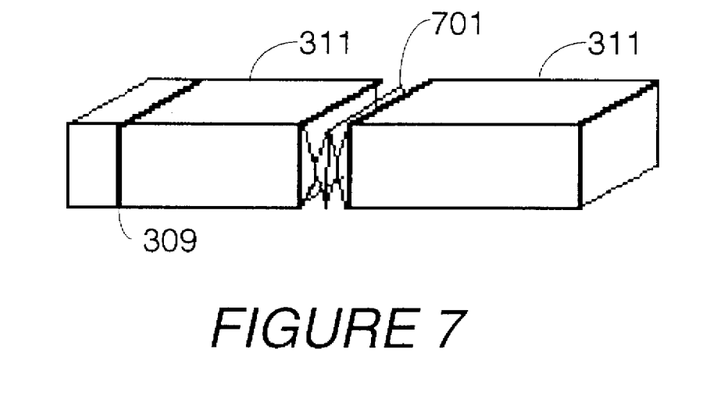
FIG. 7 is an illustration of one embodiment of a movie bar for indexing scenes in a video sequence.

Accordingly, the present invention further provides for the display 611 of "accordion" like segments in the movie bar 307. FIG. 7 schematically illustrates one embodiment of a movie bar using accordion segments. Each accordion segment 701 represents a set of related scenes 309, such as alternating shots of two persons during a conversation. When the user selects 613 one of the accordion segments 701, the movie bar 307 expands 615 to show the slices for each frame in the set of scenes 309, as in the regular movie bar 307. When the user clicks 613 on the expanded scene again, it compresses 615 back to the accordion segment 701. If the user cares to see how many frames are represented by the accordion, a fraction (e.g. 25/5060) can be displayed underneath if the user puts the cursor over the accordion, but does not click.

We claim:

1. A method of summarizing a temporally ordered plurality of scenes in a video sequence including a plurality of frames, comprising the steps of:

detecting at least one scene in the plurality of frames, each scene including at least one related frame by:
      determining for each frame at least one global measurement; and
      determining a scene change between a pair of successive frames from a difference between the global measurements of each frame in the pair of frames, a Chi-squared value on a color histogram of each frame in the pair of frames, and a normalized motion compensated pixel difference between the frames;
   determining at least one set of related scenes;
   determining a representative frame for each set of related scenes; and
   displaying each representative frame.

2. The method of claim 1, wherein the determination of the scene change is performed using a neural network receiving the difference between the global measurements, the Chi-squared value, and the normalized motion compensated pixel difference.

3. The method of claim 1, wherein the step of detecting at least one scene further comprises the steps of:
   for each frame of the video sequence, beginning with a first frame, determining a motion compensated pixel luminance difference between a current frame and a next frame; and
   responsive to the motion compensated pixel luminance difference being greater than a threshold value, associating the first frame with all frames up to and including the current frame to form a scene.

4. The method of claim 3, further comprising the step of:
   equalizing a color histogram of each frame of the video sequence prior to determining the motion compensated pixel luminance difference.

5. The method of claim 1, wherein the step of detecting at least one scene further comprises the steps of:
   for each frame of the video sequence, beginning with a first frame, determining a motion compensated edge map difference between a current frame and a next frame; and
   responsive to the motion compensated edge map difference being greater than a threshold value, associating the first frame with all frames up to and including the current frame to form a scene.

6. The method of claim 1, wherein the step of detecting at least one scene further comprises the steps of:
   for each frame of the video sequence, beginning with a first frame, determining a standard error of differences between a color histogram for a current frame and a color histogram of a next frame; and
   responsive to the standard error being greater than a threshold value, associating the first frame with all frames up to and including the current frame to form a scene.

7. The method of claim 9, wherein the standard error is measured using a Chi-squared test.

8. The method of claim 1, wherein the step determining at least one set of related scenes further comprises the steps of:
   determining for each scene a summary measure derived from all frames in the scene;
   comparing the summary measure of each scene with the summary measures of selected other scenes using a standard error measure; and
   identifying at least one set of scenes having approximately equal summary measures.

9. The method of claim 8 wherein the summary measure is an average color histogram for all frames in the scene.

10. The method of claim 8, further comprising the step of:
    linking scenes in each group of scenes into a consolidated scene for display as a single continuous scene.

11. The method of claim 8, wherein the representative frame for each set of related scenes is a frame temporally medial to a first frame and a last frame in the set of related scenes.

12. The method of claim 8, wherein the representative frame for each set of related scenes is selected from a longest scene in the set of related scenes.

13. A method of removing redundant scenes in a plurality of frames, each scene including at least one frame, the method comprising the steps of:
    detecting each scene in the plurality of frames, each scene including at least one related frame by:
       determining for each frame at least one global measurement; and
       determining a scene change between a pair of successive frames from a difference between the global measurements of each frame in the pair of frames, a Chi-squared value on a color histogram of each frame in the pair of frames, and a normalized motion compensated pixel difference between the frames;
    determining for each scene, an average color histogram for all frames included the scene; and
    comparing the average color histogram of each scene with the average color histogram of each of a selected number of subsequent scenes to identify scenes within the selected number of scenes having substantially similar average color histograms, each set of scenes having substantially similar average color histograms forming a set of related scenes.

14. The method of claim 13 wherein the step of comparing is performing by determining a Chi squared value for the average color histograms of each pair of scenes.

15. A method of removing redundant scenes in a plurality of frames, each scene including at least one frame, the method comprising the steps of:
    detecting each scene in the plurality of frames, each scene including at least one related frame by:

determining for each frame at least one global measurement; and determining a scene change between a pair of successive frames from a difference between the global measurements of each frame in the pair of frames, a Chi-squared value on a color histogram of each frame in the pair of frames, and a normalized motion compensated pixel difference between the frames;

determining for each scene a summary measure derived from all frames in the scene; and comparing the summary measure of each scene with the summary measure of selected subsequent scenes using a standard error measure to identify at least one group of scenes having substantially similar summary measures.

16. The method of claim 15 wherein the summary measure is an average color histogram.

17. The method of claim 15, wherein the selected other scenes consists of a predetermined number of subsequent scenes.

18. The method of claim 15, further comprising the step of:

linking scenes in each group of scenes into a consolidated scene.

19. The method of claim 15, wherein the representative frame for each set of related scenes a frame temporally medial to a first frame and a last frame in the set of related scenes.

20. The method of claim 1, further comprising the steps of:

displaying a plurality of slices of frames as a rectangular prism; and highlighting in the plurality of slices, the slices of frames either a first frame or a last frame of each scene.

21. The method of claim 20, further comprising the step of retrieving in response to user selection of any frame, the scene including the selected frame.

22. The method of claim 20, further comprising the steps of:

determining at least one scene having a time duration in excess of a threshold;

displaying for the scene, and within the rectangular prism at the location of the scene, a compressed representation of all frames in the scene; and responsive to a user selection of the compressed representation, displaying a plurality of slices for all frames in the scene.

23. A system for summarizing a temporally ordered plurality of scenes in a video sequence including a plurality of frames, comprising:

an input device for receiving an input video sequence;

a scene change detector coupled to the input device, the scene change detector detecting at least one scene in the plurality of frames, each scene including at least one related frame, the scene change detector detecting a scene change between a pair of successive frames from a difference between a global measurement of each frame in the pair of frames, a Chi-squared value on a color histogram of each frame in the pair of frames, and a normalized motion compensated pixel difference between the frames;

a related scene detector, coupled to the scene change detector to receive a set of scenes, and determining at least one set of related scenes, the related scene detector determining a representative frame for each set of related scenes;

a display for displaying the representative frame, and selected scenes; and a user interface display driver coupled to the related scene detector to receive the representative frames, and displaying each representative frame on the display.

24. The system of claim 23, further comprising:

a movie bar generator coupled to receive the scenes from the scene change detector, and the related scenes from the related scene detector, the movie bar generator creating a slice of each frames in each scene, and displaying the slices as rectangular prism.

* * * * *